US006507330B1

(12) United States Patent
Handschy et al.

(10) Patent No.: US 6,507,330 B1
(45) Date of Patent: Jan. 14, 2003

(54) DC-BALANCED AND NON-DC-BALANCED DRIVE SCHEMES FOR LIQUID CRYSTAL DEVICES

(75) Inventors: Mark A. Handschy, Boulder, CO (US); Jiuzhi Xue, Broomfield, CO (US); Lianhua Ji, Boulder, CO (US)

(73) Assignee: Displaytech, Inc., Longmont, CO (US)

( * ) Notice: Subject to any disclaimer, the term of this patent is extended or adjusted under 35 U.S.C. 154(b) by 0 days.

(21) Appl. No.: 09/809,741

(22) Filed: Mar. 14, 2001

Related U.S. Application Data

(63) Continuation-in-part of application No. 09/388,249, filed on Sep. 1, 1999.

(60) Provisional application No. 60/189,214, filed on Mar. 14, 2000.

(51) Int. Cl.[7] .......................... G09G 3/36; G02F 1/135

(52) U.S. Cl. .......................................... 345/94; 349/25

(58) Field of Search ............................ 345/87, 88, 89, 345/90, 94, 95, 96, 97, 98, 99, 102; 349/25, 33, 34, 36, 37

(56) References Cited

U.S. PATENT DOCUMENTS

| | | | | | |
|---|---|---|---|---|---|
| 4,709,995 | A | | 12/1987 | Kuribayashi et al. | |
| 5,436,742 | A | * | 7/1995 | Tanaka et al. | 349/25 |
| 5,748,164 | A | | 5/1998 | Handschy et al. | |
| 5,757,348 | A | * | 5/1998 | Handschy et al. | 345/89 |
| 5,808,800 | A | | 9/1998 | Handschy et al. | |
| 5,835,075 | A | * | 11/1998 | Nomura et al. | 345/97 |
| 5,933,202 | A | | 8/1999 | Watannabe et al. | |
| 6,016,173 | A | * | 1/2000 | Crandall | 349/25 |
| 6,067,065 | A | * | 5/2000 | Worley, III et al. | 345/94 |
| 6,104,367 | A | * | 8/2000 | McKnight | 345/94 |
| 6,144,353 | A | * | 11/2000 | McKnight | 345/94 |
| 6,157,432 | A | * | 12/2000 | Helbing | 349/25 |
| 6,191,766 | B1 | * | 2/2001 | Kasai et al. | 345/89 |
| 6,243,065 | B1 | * | 6/2001 | Robrish et al. | 345/97 |
| 6,262,703 | B1 | * | 7/2001 | Perner | 345/90 |
| 6,313,820 | B1 | * | 11/2001 | Helbing et al. | 345/96 |

FOREIGN PATENT DOCUMENTS

| | | |
|---|---|---|
| EP | 0 373 786 | 6/1990 |
| WO | 96/06422 | 2/1996 |
| WO | 97/31359 | 8/1997 |
| WO | 98/27537 | 6/1998 |

OTHER PUBLICATIONS

Hajime Nakamura, Kuniake Sueoka, Koichi Miwa and Michikazu Noguchi, A Novel pi–cell LCD with a Good Motion Picture Display Quality Comparable to CRT, 1999, Ekisho vol. 3 No. 2.

* cited by examiner

*Primary Examiner*—Dennis-Doon Chow
*Assistant Examiner*—Paul A. Bell
(74) *Attorney, Agent, or Firm*—Robert G. Crouch; Marsh Fischmann & Breyfogle LLP

(57) ABSTRACT

A method of operating a liquid crystal cell includes DC-balancing by displaying an inverse image with electric fields of increased magnitude relative to the image producing electric fields. While the inverse image is displayed the image is prevented from being visible by either turning off the light source or re-directing or blocking the light from reaching the viewing area. The image producing electric fields and the inverse image producing electric fields are such that the cumulative time integral of the electric fields that are present in one direction across the liquid crystal material is substantially equal to the cumulative time integral of the electric fields that are present in the opposite direction during the given period of time during the operation of liquid crystal cell. The time duration of the inverse image portion is shorter than the time duration of the image portion by an amount proportional to the increased magnitude of the additional electric fields. Because of the shorter time period when no image is visible, the system brightness is increased.

22 Claims, 7 Drawing Sheets

DC-BALANCED AND NON-DC-BALANCED DRIVE SCHEMES FOR LIQUID CRYSTAL DEVICES

This application claims priority from U.S. Provisional Patent Application No. 60/189,214, filed Mar. 14, 2000, and entitled "LIQUID CRYSTAL DISPLAY PANEL," the contents of which are incorporated herein by reference. In addition, this application claims priority as a continuation-in-part from U.S. patent application Ser. No. 09/388,249, filed Sep. 1, 1999, and entitled "NON-DC-BALANCED DRIVE SCHEME FOR LIQUID CRYSTAL DEVICE," the contents of which are incorporated herein by reference.

FIELD OF THE INVENTION

The present invention relates generally to liquid crystal devices and more specifically to schemes for driving a liquid crystal cell, such as a ferroelectric liquid crystal cell, both with and without requiring DC-balancing of the liquid crystal cell.

BACKGROUND OF THE INVENTION

In the field of image generators and especially those using spatial light modulators (SLMs), it is well known that stationary and moving images, either monochrome or color, may be sampled and both color-separated and gray-scale separated pixel by pixel. These pixelated separations may be digitized, forming digitized images that correspond to the given images. These digitized images are used by devices in this field to create visual images that can be used for a direct visual display, a projected display, a printer device, or for driving other devices that use visual images as their input.

One such novel image generator is disclosed in U.S. Pat. No. 5,748,164, entitled ACTIVE MATRIX LIQUID CRYSTAL IMAGE GENERATOR, and issued May 5, 1998, which patent is incorporated herein by reference. An image generator of this type is further described in U.S. Pat. No. 5,808,800, entitled OPTICS ARRANGEMENTS INCLUDING LIGHT SOURCE ARRANGEMENTS FOR AN ACTIVE MATRIX LIQUID CRYSTAL IMAGE GENERATOR, and issued Sep. 15, 1998, which patent is also incorporated herein by reference.

As described in detail in the above recited patents, the inventions disclosed contemplate the use of a liquid crystal material, such as a ferroelectric liquid crystal (FLC) material, as a preferred light modulating medium for the spatial light modulator of the disclosed inventions. This light modulation of liquid crystal material is accomplished by establishing and maintaining electric fields across the liquid crystal material in a controlled way in order to switch the light modulating characteristics of the material. As an example, in the case of an FLC material, an electric field is established in one direction across the FLC material in order to produce a first light modulating state, for example an ON state. An electric field is established in the opposite direction across the FLC material in order to produce a second light modulating state, for example an OFF state.

Because currently available liquid crystal materials manufactured using currently available manufacturing processes are not completely insulating, and because currently available assembly processes for manufacturing liquid crystal SLMs may introduce contaminants into the SLM assembly, this formation of electric fields across the liquid crystal material may cause leakage current to flow through the liquid crystal material while the electric fields are applied to the material. If these electric fields are not balanced, the unbalanced fields (or the unbalanced leakage current) are believed to cause the degradation of the electro-optic characteristics of the liquid crystal material, thereby dramatically reducing the effectiveness and useful life of the material as a light modulating medium.

The presence of unbalanced fields across the light modulating medium tends to polarize or bias the light modulating medium if the electric fields are not balanced over time. When the electric fields are not balanced, it is believed that the net electric field in one direction causes ionic charges to migrate through the light modulating medium and build up or stick on the sides of the light modulating medium. This sticking or build up of ionic charges tends to interfere with the electric fields subsequently applied to the light modulating medium and therefore interfere with the operation of the spatial light modulator. This interference typically results in image sticking that interferes with the proper operation of the display system. For purposes of this specification, image sticking is defined as unwanted image interference during a given frame that is caused by latent electrical effects caused by previous image frames. Traditionally, this problem of image sticking is avoided or reduced by DC-balancing the driving electric field applied to the FLC material. As mentioned above, in the case of FLC materials, the materials are switched to one state (i.e. ON) by applying a particular voltage through the material (i.e. +2.5 VDC) and switched to the other state (i.e. OFF) by applying a different voltage through the material (i.e. −2.5 VDC). Because FLC materials respond differently to positive and negative voltages, it is not a trivial matter to simply DC balance them with a single signal in situations where it is desired to vary the ratio of ON time to OFF time arbitrarily. Therefore, DC-field balancing for FLC SLMs is most often accomplished by displaying a frame of image data for a certain period of time. Then, a frame of the inverse image data is displayed (but made not visible) for an equal period of time in order to obtain an average DC field of zero for each pixel making up the SLMs.

In the case of an active matrix image generating system or display, the image produced by the SLM during the time in which the frame is inverted for purposes of DC-balancing is not typically made available to the user. If the system were viewed during the inverted time without correcting for the inversion of the image, the image would be degraded. In the case in which the image is inverted at a frequency faster than the critical flicker rate of the human eye, the overall image would be completely washed out and all of the pixels would appear to be half on. In the case in which the image is inverted at a frequency slower than the critical flicker rate of the human eye, the viewer would see the image switching between the positive image and the inverted image. Neither of these situations would provide a usable display.

In one approach to solving this problem, the light source used to illuminate the SLM is switched off or directed away from the SLM during the time when the frame is inverted. However, this approach substantially limits the brightness and efficiency of the system. In the case where the magnitude of the electric field during the DC-balancing and the time when the frame is inverted is equal to the magnitude of the electric field and the time when the frame is viewed, the light from a given light source may only be utilized a maximum of 50% of the time.

In order to overcome this problem of not being able to view the system during the DC-balancing frame inversion time, compensator cells have been proposed for SLMs. For example, U.S. Pat. No. 6,100,945, entitled COMPENSATOR ARRANGEMENTS FOR A CONTINUOUSLY VIEWABLE, DC FIELD-BALANCED, REFLECTIVE, FERROELECTRIC LIQUID CRYSTAL DISPLAY SYSTEM, and issued Aug. 8, 2000, which patent is incorporated herein by reference, discloses several approaches to providing display systems that include compensator cells. These compensator cells are intended to correct for the frame inversion during the time when the FLC pixel is being operated in its inverted state, thereby allowing the display to be substantially continuously viewable. Although these compensator cell arrangements appear to work well, they increase the complexity and cost of the display system by requiring the use of a compensator cell and in many cases other additional components.

Much of the earliest work with FLC displays also encountered the DC balance problem and a class of solutions was found. The early work dealt with passive matrix displays, because the unique properties of FLCs were expected to enable much larger displays having many more rows and columns of pixels than were then allowed using passive matrix nematic displays. There is a large amount of patent and scientific literature associated with passive matrix FLC displays. However, U.S. Pat. No. 4,709,995 issued to Kuribayashi is typical of the approach to DC balance taken in almost all such work.

In a passive matrix FLC display, the pixels are defined as the intersection of a column electrode with a row electrode. The column electrodes are formed as long, narrow, and parallel conductors that run entirely across the display with each column electrode being the width of one pixel. Likewise, the row electrodes are long, narrow, and parallel conductors that run entirely across the display in a direction perpendicular to the column electrodes with each row electrode being the height of one pixel. These electrodes typically consist of transparent Indium-Tin-Oxide, and this material is deposited directly onto the inner surfaces of two glass substrates. The column electrodes are put on one substrate, while the row electrodes are put on the second substrate. The substrates are then assembled to have the FLC layer between them.

There are no active transistors or other similar components in a passive matrix display. The FLC material comprising a pixel is forced to one of two electro-optic states (ON or OFF in the display) by the application of an electric field. In the passive matrix display, the image data are written to the display a row at a time, and all the rows are written, usually sequentially, during each image frame. Any given row is selected for writing by applying a particular voltage to the associated row electrode. Meanwhile, the image data for each pixel in the selected row are applied to each associated column electrode as a particular voltage. The difference between these two voltages provides the electric field needed to switch each specific FLC pixel. After a short time, the next row is selected and the image data are written to it with the appropriate pixel voltages applied to the columns. Typically, voltages greater than 10V magnitude are applied to the electrodes, since only such high voltages can cause the FLC to switch in the very small fraction of the frame time during which the image data are actually applied to any one row.

It is necessary to DC balance the electric field applied to any passive matrix FLC pixel, in addition to switching the pixel into the proper state. The generic method for accomplishing this in passive matrix displays is to first apply a field which would switch the pixel to the opposite state from the one that is wanted. After the false initial field, the field that will put the pixel into the desired state is then applied. This pulse-pair switching approach is accomplished by applying a succession of electrical pulses to the row and column electrodes associated with any one row during the time it is being written. The succession of pulses are arranged for each pixel so that the integral of the applied field over the row time becomes zero, and this result must be true for both the ON and the OFF states.

During most of each image frame, any given row is not selected, so that the data appearing on the column electrodes is almost always associated with the pixels of some other row. This circumstance requires that the FLC in the pixel be bistable. Bistability means that 1) the FLC must maintain the proper electro-optic state for one entire frame interval even though the electric field which selected that state is no longer present and 2) the FLC must maintain the proper electro-optic state despite the fact that voltages directed to other rows are constantly appearing on the column electrodes and these will try to perturb any given pixel from its proper state.

Much of the prior art associated with passive matrix displays, including U.S. Pat. No. 4,709,995, constitutes the disclosure of particular sequences of voltage pulses to the row and column electrodes, which sequences are especially suited to operate the pixels of passive matrix displays of various designs. All of the known methods and apparatus regarding passive matrix displays require FLC bistability. These methods and apparatus will not make a successful display if they are applied to a FLC material that is not bistable. Also, all of the passive matrix prior art concerns methods or apparatus that provide approximately DC balanced operation.

To use an FLC material that is not bistable requires that the electric field that selects the electro-optic state must be present throughout the entire frame time. A passive matrix display and the associated methods of operation cannot accomplish such continuous application of the electric field. The present invention applies to active matrix displays that maintain a selected electric field at all times. This means that the active matrix methods and apparatus of the present invention could not make use of the prior art passive matrix drive waveforms.

The present invention discloses novel methods for solving or reducing the above described image sticking problems caused by unbalanced electric fields both with and without requiring DC-balancing. These novel methods improve the effectiveness of the display system without increasing the complexity of the system, as would be the case if compensators were required.

SUMMARY OF THE INVENTION

The present invention relates generally to a method of operating a liquid crystal cell during a given period of time, the method using input image data to control how the cell is operated. The method includes applying image producing electric fields of a first magnitude to the cell during a first portion of the given period of time, the image producing electric fields depending in a predetermined way upon the input image data. The method also includes applying additional electric fields of a higher, second magnitude to the cell during a second portion of the given period of time, the image producing electric fields and the additional electric fields being such that the cumulative time integral of the electric fields that are present in one direction across the liquid crystal material is substantially equal to the cumulative time integral of the electric fields that are present in the opposite direction during the given period of time during the operation of the liquid crystal cell.

The image data may be divided into frame image data corresponding to individual frames of image data, the given period of time may be a frame time associated with one frame of image data, and the method may be a method of operating the liquid crystal cell for a plurality of frame times at a certain frame rate. The liquid crystal cell may be a ferroelectric liquid crystal cell including ferroelectric liquid crystal material. The ferroelectric liquid crystal cell may be a ferroelectric liquid crystal spatial light modulator for modulating light directed into the spatial light modulator, the ferroelectric liquid crystal material of the spatial light modulator may be divided into a plurality of individually controllable pixels, and the operation of applying image producing electric fields to the cell may includes applying image producing electric fields to each of the individually controllable pixels during the first portion of the given period of time, thereby causing the individually controllable pixels to form a desired light modulating pattern for modulating light directed into the spatial light modulator.

The spatial light modulator may be part of an overall display system that includes an illuminator for directing light into the spatial light modulator and the method may include causing the illuminator not to direct light into the spatial light modulator during the second portion of the given period of time during which the additional electric fields are being applied to the spatial light modulator.

The ferroelectric liquid crystal material may include a top and a bottom surface, the top and bottom surfaces of the liquid crystal material being approximately coplanar. The ferroelectric liquid crystal spatial light modulator may include a top electrode located adjacent to the top surface of the ferroelectric liquid crystal material and a plurality of pixel electrodes located adjacent to the bottom surface of the ferroelectric liquid crystal material, each of the plurality of pixel electrodes being associated with, and capable of controlling, one of the plurality of pixels. Applying the additional electric fields to the cell for the second portion of the given period of time may includes (i) individually setting each pixel electrode to an electric potential related in a predetermined way to at least one of the electric fields applied to that pixel during the first portion of the given period of time during which the image producing electric fields are applied to each of the individually controllable pixels and (ii) applying a constant electric potential to the top electrode of the spatial light modulator for the second portion of the given period of time.

The setting of the pixel electrodes during the second portion of the given period of time may include inverting the polarity of the fields applied to the pixels and increasing the magnitude of the electric fields. The setting of the pixel electrodes during the second portion of the given period of time may include shortening the time duration of the electric fields by an amount proportional to the increase in the magnitude of the electric fields. The second portion of the given period of time may be less than or equal to about forty-five percent of the duration of the given period of time.

The present invention also relates to a method for operating a liquid crystal display during a given period of time, the method using input image data to control how the display is operated, the display creating visible images at a viewing area. The method includes applying a first series of voltage signals to the liquid crystal display during one portion of the period of time, the first series of voltage signals being arranged to produce an image as represented by the input image data. The method also includes allowing the display to be viewed at the viewing area, while the image is being produced by the first series of voltage signals applied to the display, by allowing illumination light to be directed to the display and from the display to the viewing area. The method also includes applying a second series of voltage signals to the liquid crystal display during another portion of the period of time, the second series of voltage signals being arranged to produce an inverse image, the second series of voltage signals being related to the first series as being inverted in polarity relative to the first series, having an increased magnitude relative to the first series, and having a shorter time duration than the first series. The method also includes substantially preventing the display from being viewed at the viewing area, while the inverse image is being produced by the second series of voltage signals applied to the display, by substantially preventing illumination light from reaching the viewing area.

The display may be made viewable or substantially not viewable by controlling the light emitted from a light source operatively associated with the liquid crystal display. The image may be made viewable or substantially not viewable by selectively allowing or substantially preventing light to pass from the light source to the liquid crystal display to the viewing area. The one portion of time may be a contiguous sub-period of the given period of time. The one portion of time may be divided into a plurality of sub-periods of the given period of time. The second series of voltage signals may have a magnitude that is at least 20% greater than the magnitude of the first series of voltage signals. The second series of voltage signals may have a magnitude that is at least 50% greater than the magnitude of the first series of voltage signals. The second series of voltage signals may have a magnitude that is at least 75% greater than the magnitude of the first series of voltage signals. The second series of voltage signals may have a magnitude that is at least twice as great as the magnitude of the first series of voltage signals.

The method may further include providing separate input connections to the liquid crystal display for connection of a first external power supply for control logic within the liquid crystal display and for connection of a second external power supply for the drive voltages within the liquid crystal display that are used in applying the first and second series of voltage signals to the liquid crystal display. The second external power supply may be switched between two different magnitudes for use in generating the first and second set of voltage signals.

The present invention also relates to a liquid crystal display system with a microdisplay panel having a first voltage supply input connection operatively associated with control logic in the microdisplay panel and a second voltage supply input connection operatively associated with pixel circuitry in the microdisplay panel. The system also includes a first power supply operating at a first voltage level, the first power supply connected to the first voltage supply input connection of the microdisplay panel and a second power supply operating at a second voltage level, the second power supply connected to the second voltage supply input connection of the microdisplay panel.

The first and the second voltage levels may be different from each other.

BRIEF DESCRIPTION OF THE DRAWINGS

The features of the present invention may best be understood by reference to the following description of the presently preferred embodiments together with the accompanying drawings in which.

DETAILED DESCRIPTION OF THE PREFERRED EMBODIMENTS

An invention is described herein for providing a method of operating a liquid crystal cell during a given period of time without requiring DC-balancing of the cell. In the following description, numerous specific details are set forth in order to provide a thorough understanding of the present invention. However, it will be obvious to one skilled in the art that the present invention may be embodied in a wide variety of specific configurations. Also, well known liquid crystal cell manufacturing processes and known methods of controlling liquid crystal cells using various electrical circuits will not be described in detail herein so as not to unnecessarily obscure the present invention.

The method of the present invention may be used with a wide variety of types of liquid crystal cells that may be used in a wide variety of specific applications. However, for purposes of an example, the method of the present invention will be described with reference to a ferroelectric liquid crystal display system such as those described in the above referenced U.S. Pat. Nos. 5,748,164 and 5,808,800. Although the methods of the present invention will be described with reference to these specific types of ferroelectric liquid crystal display systems, it should be understood that the methods of the present invention are not limited to these types of systems. Instead, the novel methods disclosed herein may be utilized to operate all types of liquid crystal cells including a wide variety of types of ferroelectric liquid crystal cells and nematic liquid crystal cells. Also, the present invention is not limited to display systems but instead would equally apply to any systems that use liquid crystal cells that may exhibit problems as a result of image-sticking caused by unbalanced electric fields passed through the cell.

Figure 1:
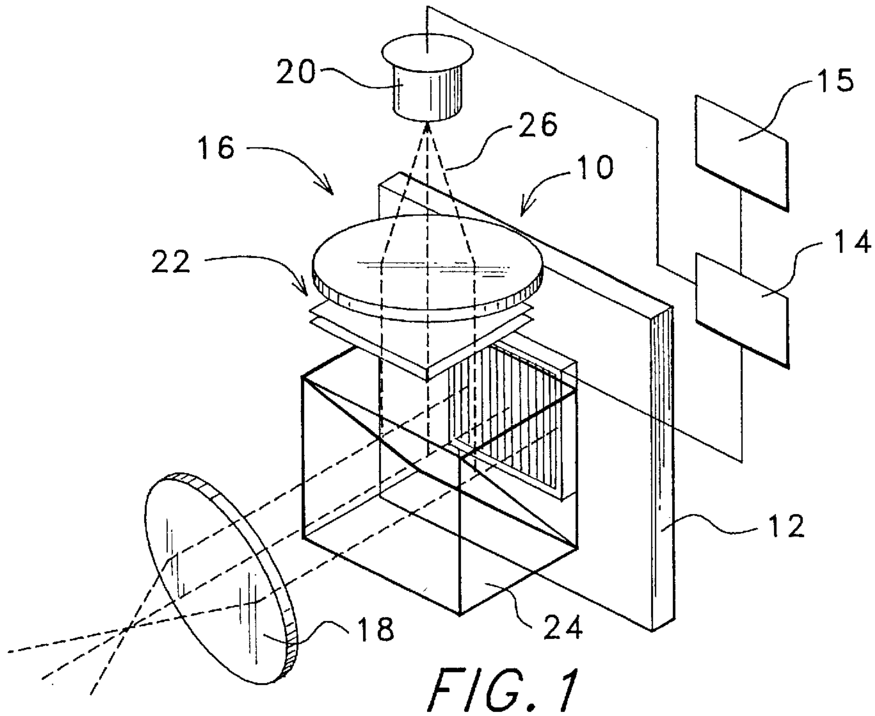
FIG. 1 is a diagrammatic perspective view of an exemplary FLC SLM based display system which may be operated using the methods of the present invention.

Referring initially to FIG. 1, an exemplary miniature display system generally designated by reference numeral 10 will be described. As is described in detail in the above referenced patents, the display system includes a ferroelectric liquid crystal VLSI (FLC/VLSI) spatial light modulator 12. Display system 10 also includes a data writing arrangement 14 for controlling FLC/VLSI spatial light modulator 12 and a video or digitized image source 15 which creates or provides, as an input to data writing arrangement 14, digitized images or input image data. Display system 10 further includes an illumination arrangement generally designated by reference numeral 16 for illuminating spatial light modulator 12 and an appropriately designed readily available lens 18 for producing a viewable image of the SLM. FLC/VLSI spatial light modulator 12 includes an array of individually addressable pixels, not shown in FIG. 1, designed to be switched by data writing arrangement 14 between ON (light) and OFF (dark) states. Illumination arrangement 16 includes a light source 20 that may be switchably controlled by data writing arrangement 14, a collimating arrangement 22, and a polarizer/analyzer 24.

In a system such as display system 10, either unpolarized or polarized light that is generated by light source 20 in the form of light rays 26 is collected by collimating arrangement 22 and directed into polarizer/analyzer 24. The polarizer/analyzer 24 causes light of a particular polarization state, for example S-polarized light, to be directed into FLC/VLSI spatial light modulator 12 while any light of the opposite polarization state, for example P-polarized light is lost. The polarized light directed into FLC/VLSI spatial light modulator 12 is reflected back to polarizer/analyzer 24 by the individual pixels of the spatial light modulator. As the light passes through the pixels, the light's polarization state is either maintained (for example S-polarized) or changed (for example P-polarized) depending on the ON/OFF state of the individual pixels of FLC/VLSI spatial light modulator 12. For the pixels which are in the ON state, the polarization of the light is changed by the FLC which allows the light to pass through polarizer/analyzer 24 into lens 18 presenting a bright pixel in the array of pixels to a viewer of the display. For the pixels which are in the OFF state, the light's polarization is maintained, causing the polarizer/analyzer 24 to direct the light back up toward the light source or away from lens 18, thereby presenting a dark pixel to the viewer.

Figure 2A:
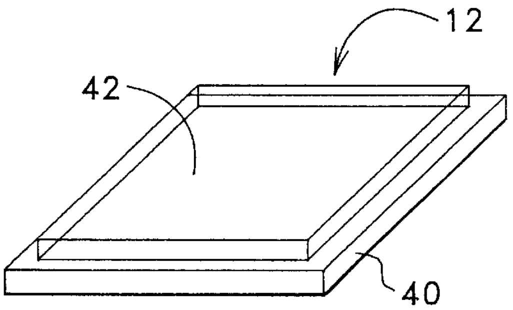
FIG. 2A is a diagrammatic perspective view of the FLC SLM of the display system of FIG. 1.
Figure 2B:
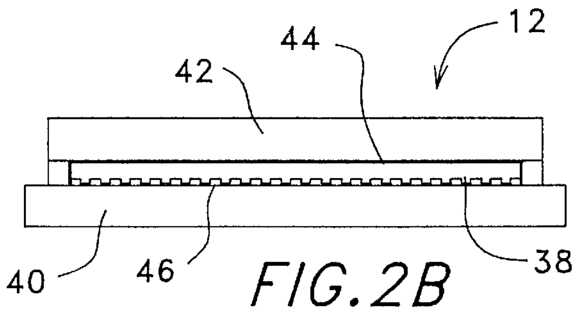
FIG. 2B is a diagrammatic cross sectional view of the FLC SLM of FIG. 2A.
Figure 2C:
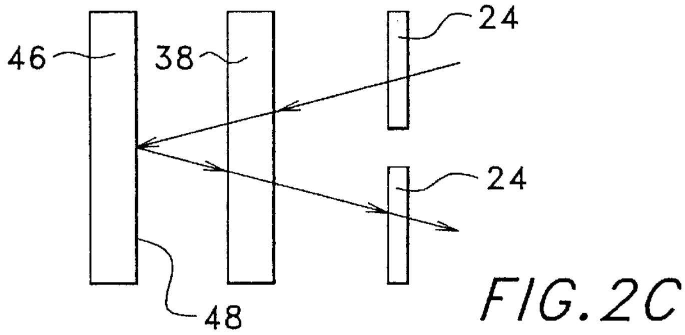
FIG. 2C is a diagrammatic illustration showing the operation of one of the pixels of the FLC SLM of FIG. 2A.

Referring now to FIGS. 2A–C, the FLC/VLSI spatial light modulator will be described in a little more detail. In this particular example of a display system, FLC/VLSI spatial light modulator 12 includes a thin layer of ferroelectric liquid crystal (FLC) 38, a silicon VLSI circuitry backplane 40, a glass window 42 and a transparent electrode 44. FLC layer 38 is confined between VLSI circuitry backplane 40 and a glass window 42. Glass window 42 is coated on its inner side with transparent electrode layer 44 which, in this case, is a layer of indium-tin oxide (ITO). VLSI backplane

40 includes an array of aluminum pads, one of which is indicated at 46. Aluminum pads 46 are positioned on the upper surface of VLSI backplane 40. Each pad has a reflective top surface 48, best shown in FIG. 2C, which is designed to reflect light directed into the spatial light modulator back out of the spatial light modulator. Each of the aluminum pads 46 making up the array of aluminum pads also acts as an electrode controlled by data writing arrangement 14 as mentioned above. These aluminum pad electrodes 46 and ITO electrode 44 positioned on the opposite side of FLC layer 38 are used to form electric fields through FLC layer 38 and divide FLC layer 38 into individually controllable FLC pixels which correspond to the positions of aluminum pads 46.

In the case of a display system such as display system 10 described above, the image data is typically divided into frame image data corresponding to individual frames of image data. Therefore, there is a given period of time that is equal to a frame time associated with one frame of image data These individual frames of image data are successively presented on the display system to produce an overall display image. The given period of time described above, which is equal to a frame time in this example, will be referred to throughout this description as the time T.

Now that the structure and operation of an exemplary display system has been briefly described, several examples of methods of operating a liquid crystal cell in accordance with the invention will be described. Each of these methods provides for the reduction or elimination of the image-sticking problems described above without requiring overall DC-balancing of the liquid crystal cell.

Throughout this specification, balancing the electric fields or DC-balancing refers to balancing the time integral of the electric fields. In other words, the electric fields are balanced when the cumulative time integral of the electric field that is present in one direction across the liquid crystal material is substantially equal to the cumulative time integral of the electric field that is present in the opposite direction during a predetermined amount of time during the operation of the spatial light modulator. Another way of stating this is that the electric fields are balanced when the average of the product of the applied voltage and the amount of time that field is present averages to substantially zero during a predetermined amount of time during the operation of the spatial light modulator.

Figure 3:
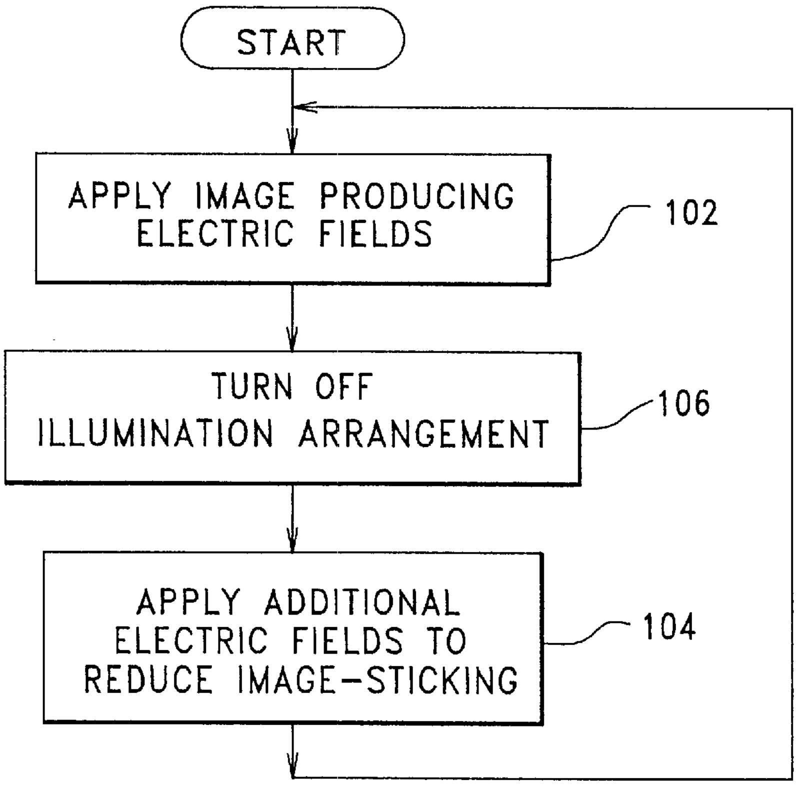
FIG. 3 is a flow diagram illustrating the various steps of a method of operating a liquid crystal cell in accordance with the invention.

Referring now to FIG. 3, a first embodiment of a method in accordance with the invention which may be used to operate a display system such as display system 10 will be described. As mentioned above, the display system uses input image data to control how the cell is operated. In this embodiment, the method includes the step of applying image producing electric fields to the cell during a first portion of a given period of time T as indicated by block 102. These image-producing electric fields depend in a predetermined way upon the input image data provided by the display system. As indicated in block 104 of FIG. 3, the method further includes the step of applying additional electric fields to the cell during a second portion of the given period of time T. Additionally, in the case in which the display system includes an illuminator for directing light into the spatial light modulator, the method further includes the step of causing the illuminator not to direct light into the spatial light modulator or otherwise blocking the light from passing through the lens 18 during the second portion of the given period of time T. This is indicated by block 106. This prevents the display system from being viewable during the time that the additional electric fields are being applied to the spatial light modulator.

In accordance with the invention, the combination of the image producing electric fields and the additional electric fields are not necessarily DC-balanced. That is, the cumulative time integral of the electric fields that are present in one direction across the liquid crystal material is not necessarily equal to the cumulative time integral of the electric fields that are present in the opposite direction during the given period of time that includes both the image producing electric fields and the additional electric fields. Also, in accordance with the invention, the additional electric fields are electric fields that are specifically configured to reduce the amount of image sticking caused by the image producing electric fields. That is, there is reduced image sticking compared to the amount of image sticking that would occur if only the image producing electric fields were applied to the cell during the given period of time.

As will be described in more detail hereinafter, the additional electric fields may take on a wide variety of specific configurations and still remain within the scope of the invention. The purpose of these additional electric fields is to remove, or drive back into the liquid crystal material, any built up ions that may be collected near or be sticking along one of the surfaces of the liquid crystal material as a result of the image producing electric fields. As described above, in the past, this has typically been achieved by DC-balancing the liquid crystal cell which typically requires that the image producing electric fields be inverted and directed through the liquid crystal cell to counter act any biases created by the image producing electric fields. However, as also mentioned above, this means that, if the same magnitude electric fields are used during the time DC-balancing is being performed, the display may not be viewed during half of the overall time without the use of some type of a compensator cell.

In a preferred embodiment of the present invention, the second portion of the given period of time during which the additional electric fields are directed through the liquid crystal cell is substantially shorter in duration than the first portion of the given period of time during which the image producing electric fields are directed through the liquid crystal cell. This shorter second portion of the given period of time T insures that the illumination arrangement is more efficiently utilized than would be the case if a conventional DC-balanced system that switched off the illumination arrangement for half of the time were utilized. Using some of the specific approaches of the present invention as described immediately below, it has been found that using a second portion of the given period of time that is less than or equal to about twenty percent of the duration of the given period of time T produces a substantial reduction in the image-sticking problem while providing a substantial improvement in the efficiency of the use of the illumination arrangement.

Now that the basic steps of the method of the present invention have been described, several specific examples will be described for illustrative purposes. Although only a few specific examples of methods of operating a liquid crystal cell in accordance with the invention will be described in detail, it should be understood that the invention would equally apply to a wide variety of specific methods. This is the case so long as the additional electric fields are configured to reduce the image-sticking problems described above.

Figure 4:
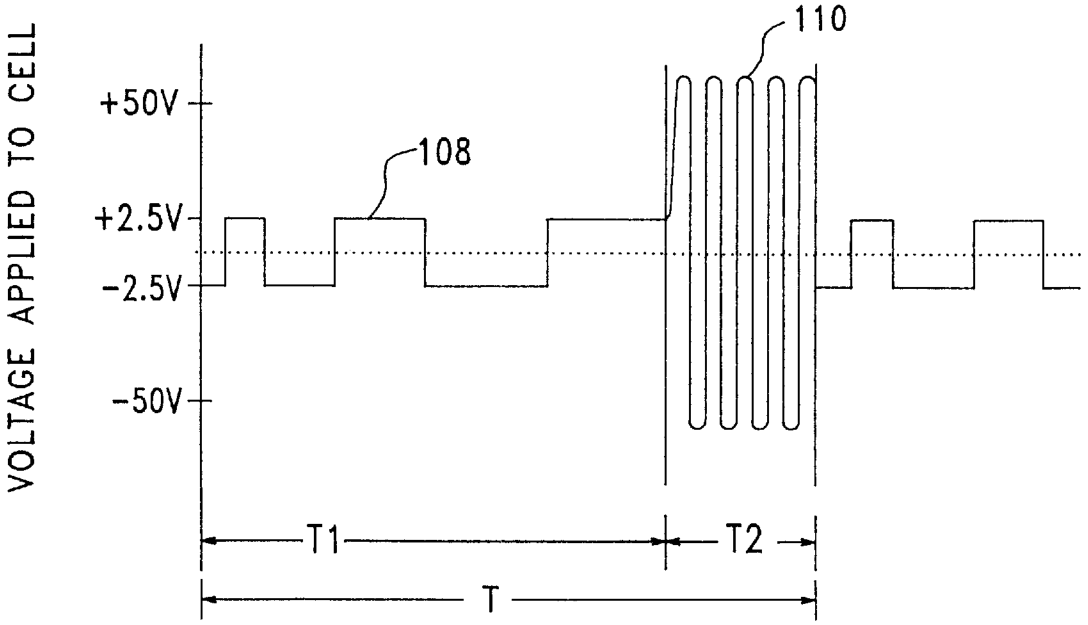
FIG. 4 is a graph illustrating a first embodiment of the electric field voltages used to operate a liquid crystal cell in accordance with the invention during a given time period.

Referring now to FIG. 4, a first specific embodiment of a method of operating a liquid crystal cell will be described. For the following examples, it will be assumed that the method is being used to operate a display system such as display system 10 that includes spatial light modulator 12. FIG. 4 is a graph illustrating the voltages of the various electric fields applied to the liquid crystal cell during the given time period T. Time period T is divided into two portions T1 and T2. In a simple example, time period T may correspond to one image frame for a display system. Alternatively, for a color display, time period T may correspond to one of three different color subframes that in turn make up an overall image frame.

In the embodiment being described, the image producing electrical fields take the form of either positive or negative 2.5VDC electric fields applied to the cell. These voltages are applied during the first portion of the time period indicated by T1 and are illustrated by stepped line 108 in FIG. 4. Each of these steps may correspond to one of several subframes that provide binary control of the gray scale of the liquid crystal cell as described in detail in the above referenced U.S. Pat. No. 5,748,164. The liquid crystal cell is switched on and off in a manner that modulates light directed into the cell in a desired manner during the time period T1 as is well known in the art. However, in accordance with the invention, the given period of time T also includes a second portion of time T2 during which additional electric fields are applied to the liquid crystal cell in order to reduce or eliminate the image-sticking problem.

As illustrated in FIG. 4, the additional electric fields of this embodiment take the form of a relatively high alternating voltage waveform as indicated by waveform line 110. In this case, the maximum voltage of the alternating waveform 110 used during time T2 is about one to twenty times (i.e. 2.5 to 50VDC) the maximum voltage (i.e. 2.5VDC) of the electric fields used to normally switch the liquid crystal cell between its on and off states during time T1. Also, in this embodiment, alternating waveform oscillates from its maximum positive to its maximum negative voltage one to several times within the time period T2. As mentioned above, light is not directed into the liquid crystal cell during time T2 thereby preventing any degradation of the desired image by the optical effects caused by waveform 110.

Although the alternating waveform is described as being a waveform having a maximum voltage about one to twenty times that of the voltage used to switch the cell between its on and off state, this is not a requirement. Instead, the voltage may be a wide variety of voltages however it appears as though voltages in the range of about 1–20 times the normal switching voltage are most effective. Also, it has been found, that for some currently available liquid crystal cells, voltages substantially greater than about twenty times the normal switching voltage may potentially cause new forms of damage or other problems to the cell.

As mentioned above, display systems of the type being described typically are operated at a certain frame rate, for example 60 frames per second. At this frame rate, each frame, which corresponds to the time period T, lasts approximately 16.67 milliseconds. Since the time period T2 during which the additional electric fields are applied to the cell preferably lasts no more than about twenty percent of the time period T, time period T2 last no more than about 3.3 milliseconds. Therefore, in order to have alternating waveform 110 oscillate one to several times within T2, alternating waveform 110 would have a frequency of up to about 1000 hertz.

In accordance with the invention, it has been found that applying alternating waveform 110 to the liquid crystal cell as described above substantially reduces or eliminates the image-sticking problems described above in the background of the invention. This is the case even though the electric fields that are applied to the cell during the overall time period T are not DC-balanced. That is, this approach eliminates the need to invert the input image data and direct the electric fields associated with the inverse input data through the liquid crystal material in order to DC-balance the liquid crystal material.

Figure 5:
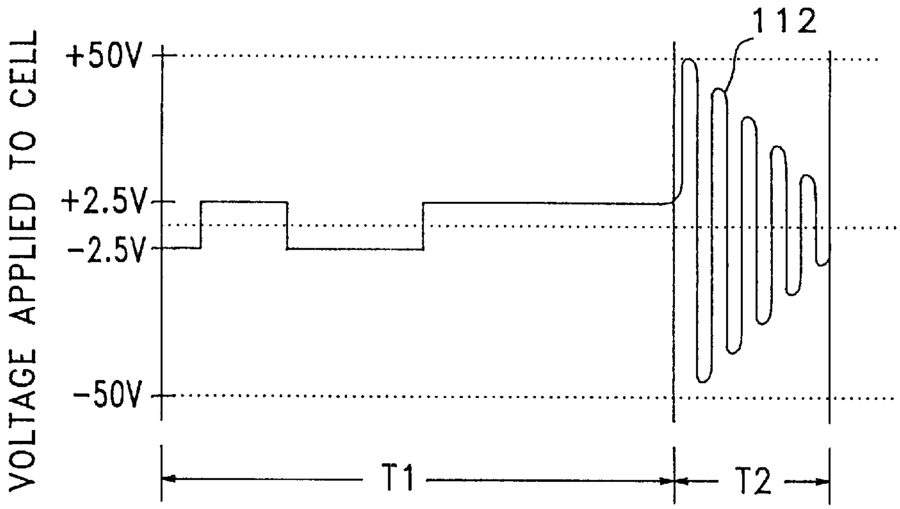
FIG. 5 is a graph illustrating a second embodiment of the electric field voltages used to operate a liquid crystal cell in accordance with the invention during a given time period.
Figure 6:
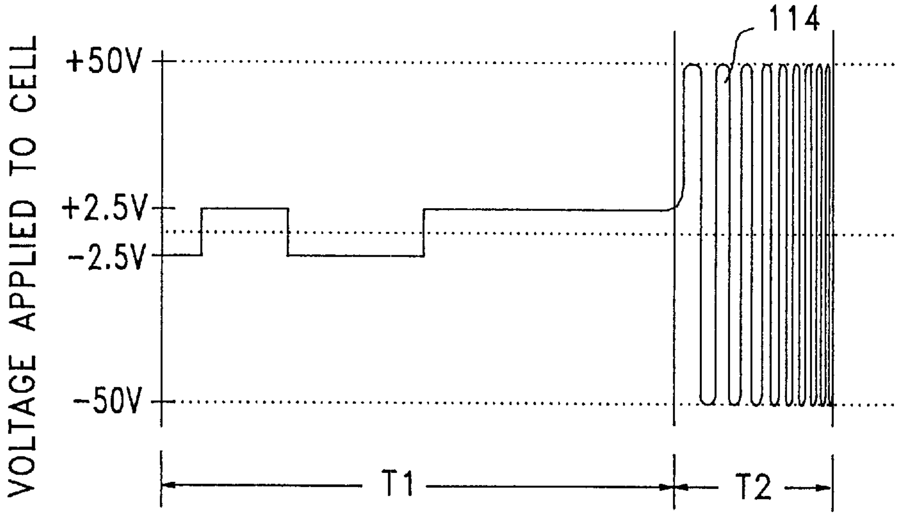
FIG. 6 is a graph illustrating a third embodiment of the electric field voltages used to operate a liquid crystal cell in accordance with the invention during a given time period.
Figure 7:
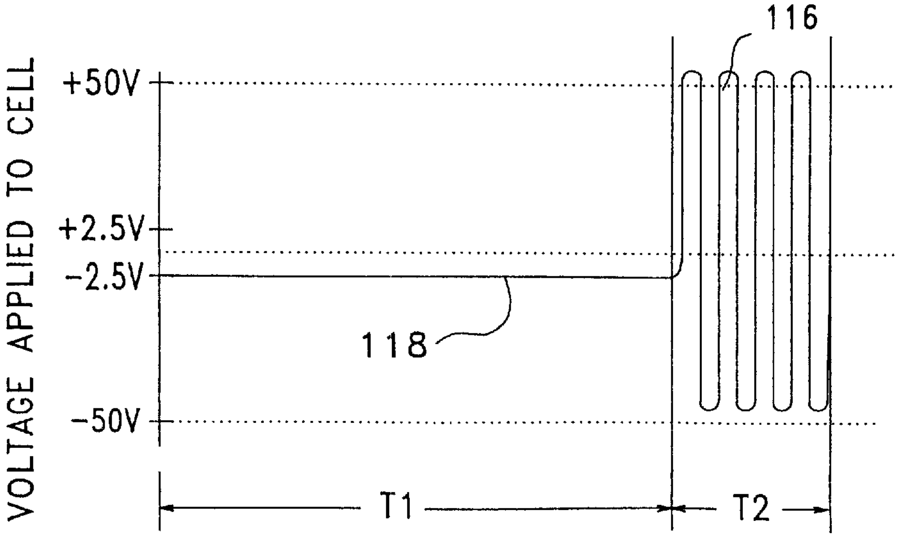
FIG. 7 is a graph illustrating a fourth embodiment of the electric field voltages used to operate a liquid crystal cell in accordance with the invention during a given time period.

Although the alternating waveform described above has been illustrated as having a substantially uniform amplitude and frequency throughout time T2, this is not a requirement of the invention. Instead, both the amplitude and the frequency may vary during the time T2. FIGS. 5–7 illustrate three alternative waveforms that may be used during time T2. In the example illustrated in FIG. 5, the magnitude of the additional electric fields that are applied to the cell during the second portion T2 of the given period of time T decrease in magnitude during the time T2 as indicated by wave form 112. Alternatively, as illustrated in FIG. 6, the additional electric fields that are applied to the cell during time T2 may be applied at an increasing frequency during time T2 as indicated by waveform 114. In still another variation, the additional electric fields that are applied to the cell during time T2 may be of a polarity, magnitude, and frequency that at least in part are dependent upon the electric fields applied to the cell during the first portion T1 of the given period of time. This is illustrated in FIG. 7 in which the electric fields applied to the cell during time T2, as indicated by alternating waveform 116, are biased toward the positive because, in this specific example, the cell is switched to the off state during the entire time TI as indicated by line 118. This approach has the effect of at least partially DC-balancing the electric fields used to operate the liquid crystal cell.

Figure 8:
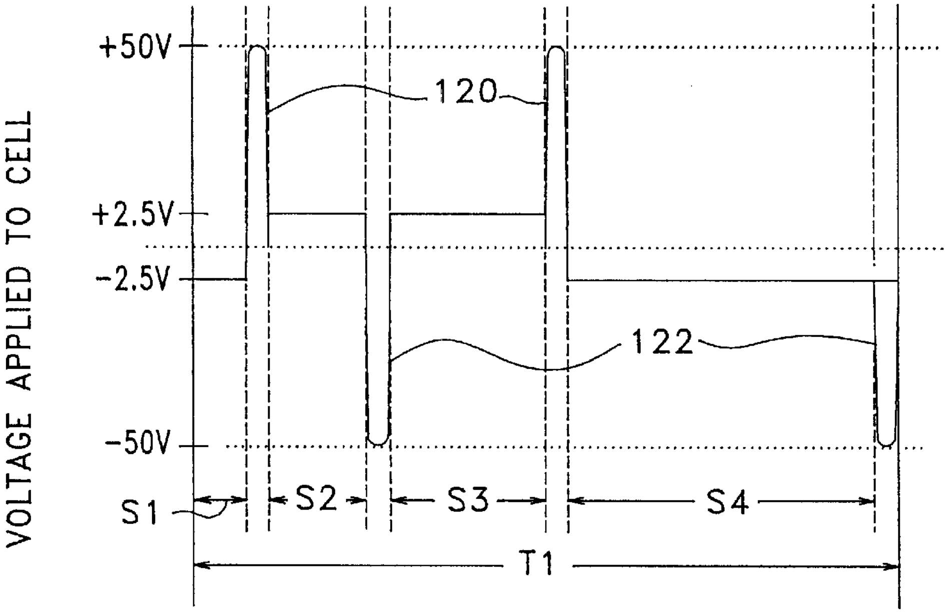
FIG. 8 is a graph illustrating a fifth embodiment of the electric field voltages used to operate a liquid crystal cell in accordance with the invention during a given time period.

Although the additional electric fields of the present invention have been described as being located at the end of each time period T, this is not a requirement of the invention, Instead, the additional electric fields can be applied at any desired time during the operation of the system. For example, as illustrated in FIG. 8, a single pulse, designed in accordance with the invention to reduce the image sticking problem, may be applied at the end of each of several subframes as indicated by waveforms 120 and 122. Of course, as mentioned above, in the case of a display, the light source is not directed the display for normal viewing while waveforms 120 and 122 are applied to the cell.

Figure 9:
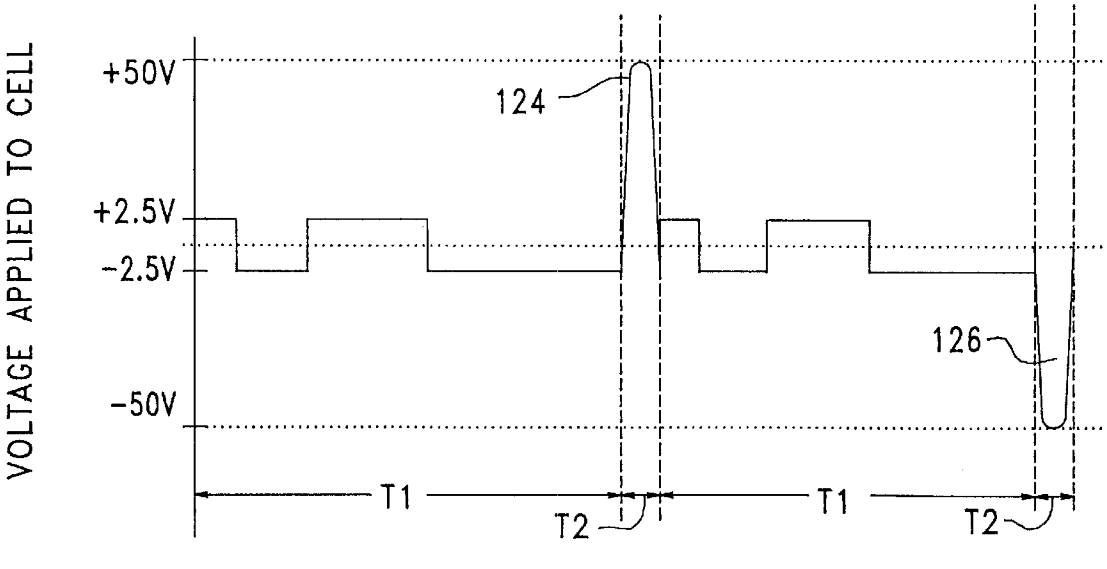
FIG. 9 is a graph illustrating a sixth embodiment of the electric field voltages used to operate a liquid crystal cell in accordance with the invention during a given time period.

Furthermore, although the additional electric fields have been illustrated in FIGS. 5–7 as including a waveform that alternates from positive to negative several times at the end of each time period T, this is not a requirement of the invention. Instead, as illustrated in FIG. 9, single pulses such as those indicated by waveforms 124 and 126 may be applied at the end of each time period T. As also illustrated in FIG. 9, these waveforms may vary from positive to negative from time period to time period. All of these various configurations would equally fall within the scope of the invention so long as these additional electric fields reduce the image sticking problem.

Referring back to FIGS. 2A–C, the methods of the present invention may be implemented in a wide variety of manners. For example, the step 104 (FIG. 3) of applying additional electric fields to the cell may be accomplished in the following manner. First, all of the pixel electrodes 46 are set to the same electric potential. Then, an electric potential having a varying magnitude and polarity is applied to top electrode 44 of the spatial light modulator for the second portion of the given period of time T2. Alternatively, each pixel electrode 46 may be set to an electric potential related in a predetermined way to at least one of the electric fields applied to that pixel during the first portion T1 of the given period of time T. With the pixel electrodes all set, an electric potential having a varying magnitude and polarity is applied to top electrode 44 of the spatial light modulator for the second portion T2 of the given period of time T.

In a third variation, an open circuit may be provided to each of the pixel electrodes 46 so as to float the electric potential of each of the pixel electrodes. Again, this embodiment further includes the step of applying an electric potential having a varying magnitude and polarity to top electrode 44 of the spatial light modulator for the second portion of the given period of time. And finally, in a fourth example, top electrode 44 of the spatial light modulator may be held at a constant electric potential. In this version, an electric potential having a varying magnitude and polarity is then applied to all of the pixel electrodes 46 for the second portion of the given period of time T2.

Figure 10:
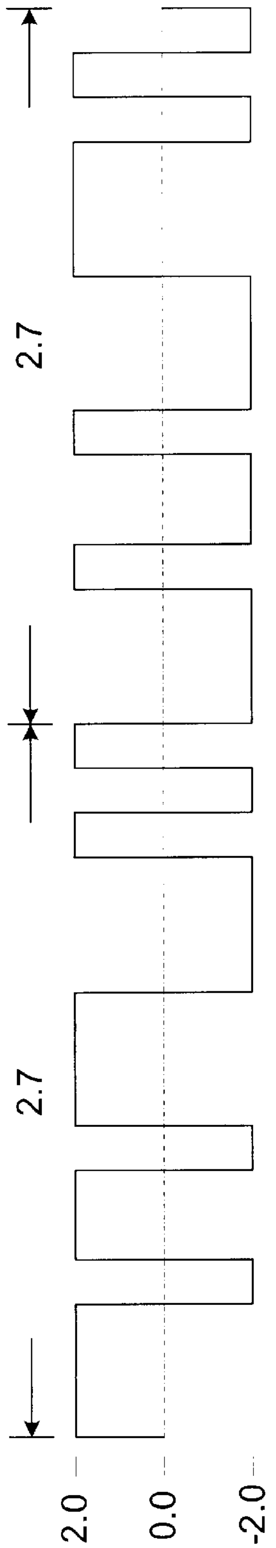
PRIOR ART Fig. 10
FIG. 10 is a graph illustrating a DC-balanced approach where the inverse image is displayed for half of a given time period.

Another approach to solving the image sticking problem without requiring a 50% duty cycle of periods when the display is visible versus periods when the display is not visible will now be discussed. This approach includes displaying the inverse image during a time when this image is not visible, but doing so with an increased voltage being applied to the cell during this inverse image portion. FIG. 10 shows the typical DC-balanced approach with a 50% duty cycle. In this example, a given pixel of the liquid crystal cell is exposed to time segments of various length with voltages at either 2.0 or −2.0 volts. As can be seen, during this first 2.7 millisecond period, the pixel is exposed to 2.0 volts more than −2.0 volts by a given amount of time. When the inverse image is applied (and the image is caused not to be visible), the pixel is exposed to −2.0 volts more than 2.0 volts by the same given amount of time. In other words, the time integral of the product of the voltage and the time duration is zero when taken across the two 2.7 ms. periods together. Thus, the pixel is exposed to a drive signal that is DC-balanced.

Figure 11:
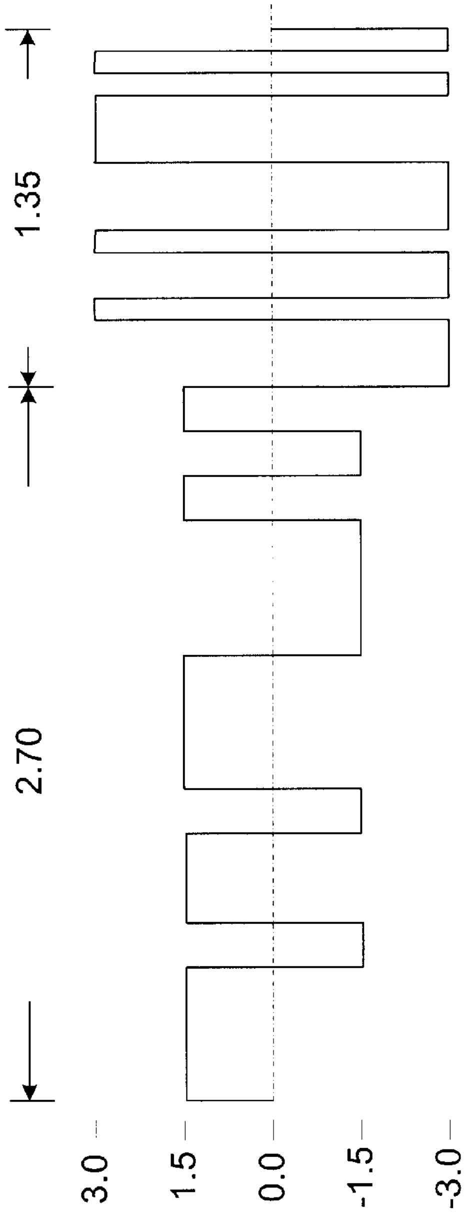
FIG. 11 is a graph illustrating a two-level drive approach for the electric field voltages used to operate a liquid crystal cell in accordance with the invention during a given time period.
Figure 12:
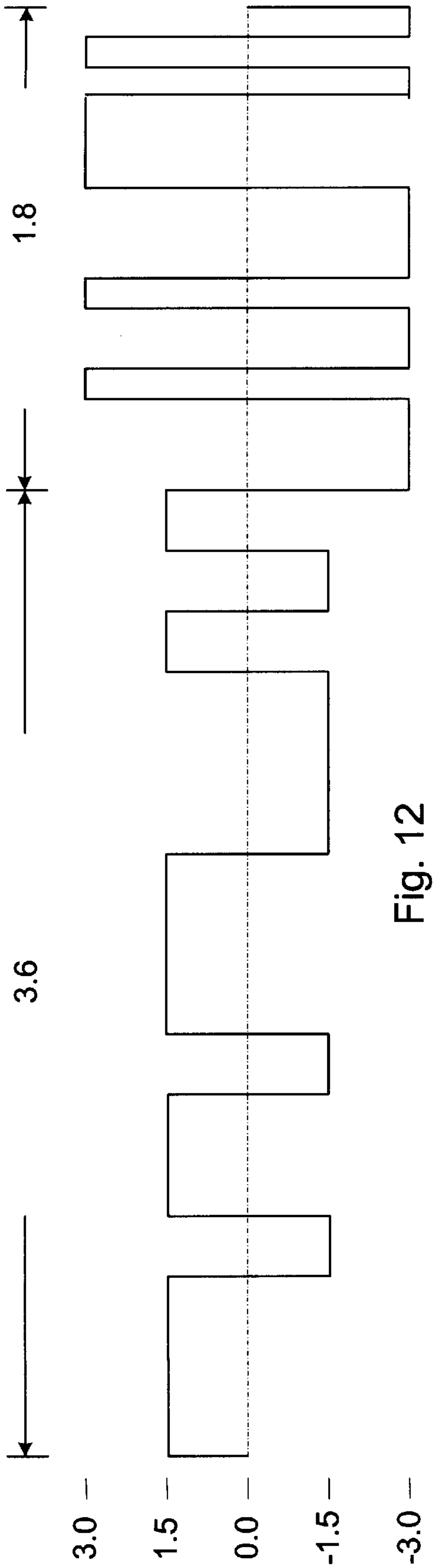
FIG. 12 is a graph illustrating the two-level drive approach of FIG. 11, in which the time period has been stretched out to match the time period of FIG. 10.

FIG. 11 show an approach where the first 2.7 millisecond period is the same as the first 2.7 millisecond period in FIG. 10, other than the relatively minor point that the drive voltages have been changed from ±2.0 volts to ±1.5 volts. For the second period of FIG. 11, however, the drive voltages are doubled to ±3.0 volts for the non-visible inverse image. Because the drive voltages are twice the value, the time durations for each signal must be half the value, in order to maintain the overall time integral at zero. For this reason, the second time period in FIG. 11, the period in which no image is visible, has a duration of only 1.35 ms. In this case, the image can be visible ⅔ of the time rather than ½ the time. This increases the brightness of the display on the order of 33.3%, an important consideration in many applications for displays of this type. This same approach of FIG. 11 is illustrated in a different time scale in FIG. 12. The regular image is still visible ⅔ of the time, but now the overall time period has been stretched to the 5.4 ms. value of the example of FIG. 10. As can be seen, the image is visible for 3.6 of the total 5.4 seconds, rather than 2.7 of the 5.4 seconds.

Figure 13:
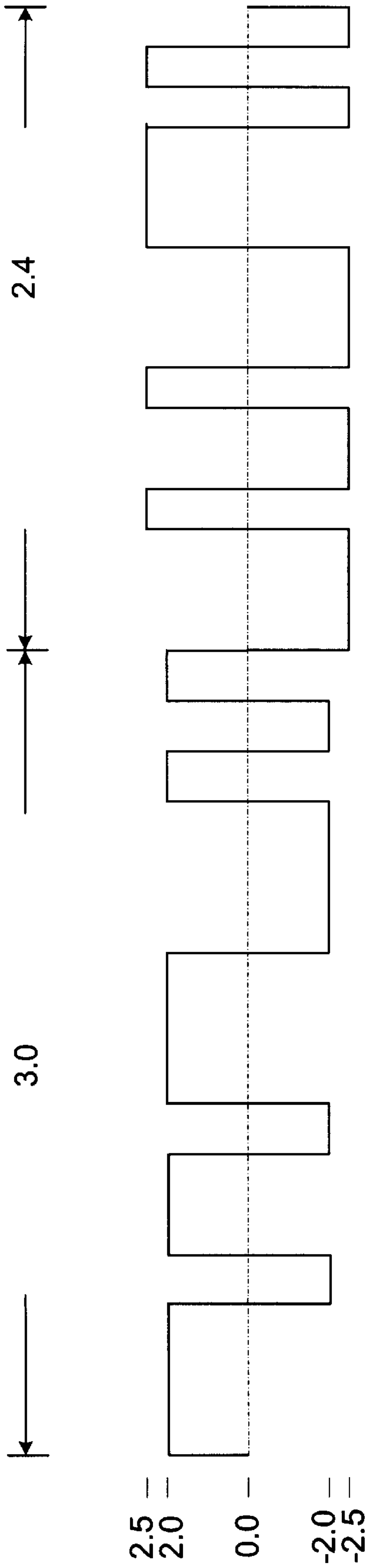
FIG. 13 is a graph illustrating a second embodiment of the two-level drive approach of the present invention.

FIG. 13 shows another example with a two-level drive voltage. In this case, in the time period when the inverse image is displayed, the drive voltages are increased from ±2.0 volts to ±2.5 volts. Since this is a ratio of 5 to 4 for the new drive voltages, the ratio between the time period is 4 to 5. In the example shown, the image is visible for 3.0 ms. and the inverse image is displayed (but not visible) for 2.4 ms. This results in an increase in brightness on the order of 11.1%

Figure 14:
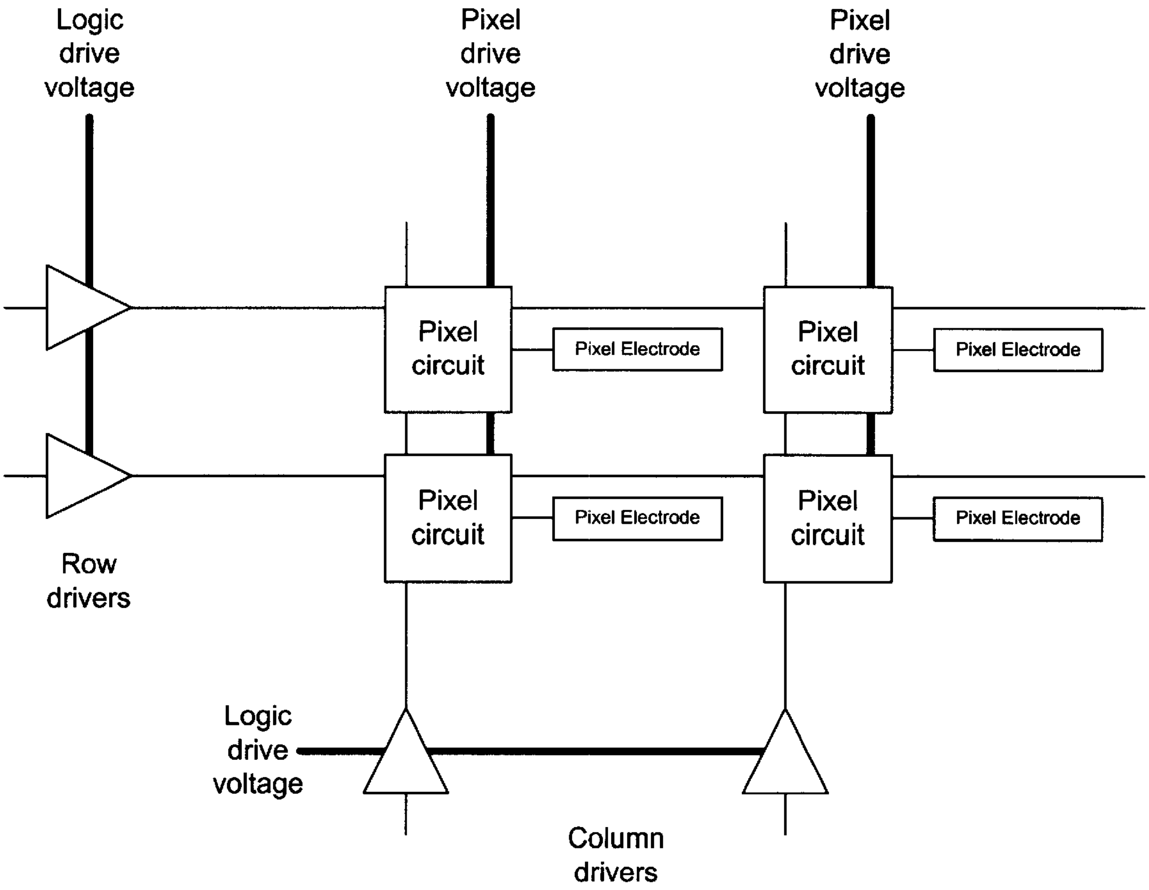
FIG. 14 is a simplified schematic diagram of circuitry associated with the pixels to implement the two-level drive approach of the present invention.

In order to allow the pixels of the spatial light modulator 12 to be driven with a selectable one of two different drive voltages, the spatial light modulator 12 and the data writing arrangement 14 can be configured to accept two different supply voltages, one for the logic and one for driving the pixels. The supply voltage to be used for driving the pixels can then be controlled and synchronized to switch voltage levels or magnitudes depending on whether it is a time period for displaying the visible image or a time period for displaying the non-visible inverse image. This is illustrated in FIG. 14, which shows four pixels in a pixel array. It can be seen that a logic supply voltage supplied to the microdisplay drives logic such as the row and column drivers, while an independent pixel supply voltage drives the pixel circuitry and is used for the electric fields that are applied to the liquid crystal material of each pixel.

Although only a few specific embodiments have been described for how the various electric fields may be applied to the liquid crystal cell, it should be understood that a wide variety of approaches may be used and still fall within the scope of the invention. Also, although only a few specific examples of waveforms that may be used have been described, it should be understood that the invention is not limited to these specific examples. Instead, a wide variety of waveforms or electric field configurations may be used so long as the additional electric fields applied to the cell reduce the problem of image sticking.

Furthermore, although the above described embodiments have been described with the various components having particular respective orientations, it should be understood that the present invention may take on a wide variety of specific configurations with the various components being located in a wide variety of positions and mutual orientations and still remain within the scope of the present invention. For example, although the methods of the present invention have been described with reference to a specific type of ferroelectric liquid crystal display system, the invention is not limited to this type of display system or to display systems in general. Therefore, the present examples are to be considered as illustrative and not restrictive, and the invention is not to be limited to the details given herein, but may be modified within the scope of the appended claims.

What is claimed:

1. A method of operating a liquid crystal cell during a given period of time, the method using input image data to control how the cell is operated, the method comprising:

applying image producing electric fields of a first magnitude to the cell during a first portion of the given period of time, the image producing electric fields depending in a predetermined way upon the input image data; and applying additional electric fields of a higher, second magnitude to the cell during a second portion of the given period of time, the image producing electric fields and the additional electric fields being such that the cumulative time integral of the electric fields that are present in one direction across the liquid crystal material is substantially equal to the cumulative time integral of the electric fields that are present in the opposite direction during the given period of time during the operation of the liquid crystal cell.

2. A method as defined in claim 1, wherein:

the image data is divided into frame image data corresponding to individual frames of image data;

the given period of time is a frame time associated with one frame of image data; and the method is a method of operating the liquid crystal cell for a plurality of frame times at a certain frame rate.

3. A method as defined in claim 1, wherein the liquid crystal cell is a ferroelectric liquid crystal cell including ferroelectric liquid crystal material.

4. A method as defined in claim 3, wherein:

the ferroelectric liquid crystal cell is a ferroelectric liquid crystal spatial light modulator for modulating light directed into the spatial light modulator;

the ferroelectric liquid crystal material of the spatial light modulator is divided into a plurality of individually controllable pixels; and the operation of applying image producing electric fields to the cell includes applying image producing electric fields to each of the individually controllable pixels during the first portion of the given period of time, thereby causing the individually controllable pixels to form a desired light modulating pattern for modulating light directed into the spatial light modulator.

5. A method as defined in claim 4, wherein:

the spatial light modulator is part of an overall display system that includes an illuminator for directing light into the spatial light modulator, and the method includes causing the illuminator not to direct light into the spatial light modulator during the second portion of the given period of time during which the additional electric fields are being applied to the spatial light modulator.

6. A method as defined in claim 4, wherein;

the ferroelectric liquid crystal material includes a top and a bottom surface, the top and bottom surfaces of the liquid crystal material being approximately coplanar;

the ferroelectric liquid crystal spatial light modulator includes a top electrode located adjacent to the top surface of the ferroelectric liquid crystal material and a plurality of pixel electrodes located adjacent to the bottom surface of the ferroelectric liquid crystal material, each of the plurality of pixel electrodes being associated with, and capable of controlling, one of the plurality of pixels; and wherein applying the additional electric fields to the cell for the second portion of the given period of time includes (i) individually setting each pixel electrode to an electric potential related in a predetermined way to at least one of the electric fields applied to that pixel during the first portion of the given period of time during which the image producing electric fields are applied to each of the individually controllable pixels and (ii) applying a constant electric potential to the top electrode of the spatial light modulator for the second portion of the given period of time.

7. A method as defined in claim 6, wherein the setting of the pixel electrodes during the second portion of the given period of time includes inverting the polarity of the fields applied to the pixels and increasing the magnitude of the electric fields.

8. A method as defined in claim 7, wherein the setting of the pixel electrodes during the second portion of the given period of time includes shortening the time duration of the electric fields by an amount proportional to the increase in the magnitude of the electric fields.

9. A method as defined in claim 1, wherein the second portion of the given period of time is less than or equal to about forty-five percent of the duration of the given period of time.

10. A method for operating a liquid crystal display during a given period of time, the method using input image data to control how the display is operated, the display creating visible images at a viewing area, the method comprising:

applying a first series of voltage signals to the liquid crystal display during one portion of the period of time, the first series of voltage signals being arranged to produce an image as represented by the input image data;

allowing the display to be viewed at the viewing area, while the image is being produced by the first series of voltage signals applied to the display, by allowing illumination light to be directed to the display and from the display to the viewing area;

applying a second series of voltage signals to the liquid crystal display during another portion of the period of time, the second series of voltage signals being arranged to produce an inverse image, the second series of voltage signals being related to the first series as being inverted in polarity relative to the first series, having an increased magnitude relative to the first series, and having a shorter time duration than the first series; and substantially preventing the display from being viewed at the viewing area, while the inverse image is being produced by the second series of voltage signals applied to the display, by substantially preventing illumination light from reaching the viewing area.

11. A method as defined in claim 10, wherein the display is made viewable or substantially not viewable by controlling the light emitted from a light source operatively associated with the liquid crystal display.

12. A method as defined in claim 10, wherein the image is made viewable or substantially not viewable by selectively allowing or substantially preventing light to pass from the light source to the liquid crystal display to the viewing area.

13. A method as defined in claim 10, wherein the one portion of time is a contiguous sub-period of the given period of time.

14. A method as defined in claim 10, wherein the one portion of time is divided into a plurality of sub-periods of the given period of time.

15. A method as defined in claim 10, wherein the second series of voltage signals has a magnitude that is at least 20% greater than the magnitude of the first series of voltage signals.

16. A method as defined in claim 10, wherein the second series of voltage signals has a magnitude that is at least 50% greater than the magnitude of the first series of voltage signals.

17. A method as defined in claim 10, wherein the second series of voltage signals has a magnitude that is at least 75% greater than the magnitude of the first series of voltage signals.

18. A method as defined in claim 10, wherein the second series of voltage signals has a magnitude that is at least twice as great as the magnitude of the first series of voltage signals.

19. A liquid crystal display system, comprising:

a liquid crystal spatial light modulator;

a data writing arrangement that that provides drive signal information to the spatial light modulator; and a light source that selectively illuminates the spatial light modulator;

wherein the drive signal information provided to the spatial light modulator includes a first series of signals for producing an image during one portion of a period of time while the spatial light modulator is illuminated by the light source and a second series of signals for producing an inverse image during an other portion of the period of time while the spatial light modulator is not substantially illuminated by the light source, the second series of signals being related to the first series as being inverted in polarity relative to the first series, having an increased magnitude relative to the first series, and having a shorter time duration than the first series.

20. A system as defined in claim 19, wherein the one portion of time is a contiguous sub-period of the given period of time.

21. A system as defined in claim 19, wherein the other portion of the given period of time is less than or equal to about forty-five percent of the duration of the given period of time.

22. A system as defined in claim 19, wherein the spatial light modulator is a ferroelectric liquid crystal spatial light modulator including ferroelectric liquid crystal material.

* * * * *